United States Patent
Wang et al.

(10) Patent No.: US 10,959,133 B2
(45) Date of Patent: Mar. 23, 2021

(54) METHOD AND DEVICE FOR PROCESSING QUALITY OF SERVICE PARAMETER IN HANDOVER SCENARIO

(71) Applicant: CHINA ACADEMY OF TELECOMMUNICATIONS TECHNOLOGY, Beijing (CN)

(72) Inventors: Ying Wang, Beijing (CN); Bin Jiao, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 78 days.

(21) Appl. No.: 16/323,767

(22) PCT Filed: Jun. 12, 2017

(86) PCT No.: PCT/CN2017/087901
§ 371 (c)(1),
(2) Date: Feb. 6, 2019

(87) PCT Pub. No.: WO2018/028295
PCT Pub. Date: Feb. 15, 2018

(65) Prior Publication Data
US 2019/0215735 A1 Jul. 11, 2019

(30) Foreign Application Priority Data
Aug. 12, 2016 (CN) .......................... 201610663580.1

(51) Int. Cl.
*H04W 36/00* (2009.01)
*H04W 36/08* (2009.01)
(Continued)

(52) U.S. Cl.
CPC ....... *H04W 36/0044* (2013.01); *H04W 28/16* (2013.01); *H04W 28/24* (2013.01);
(Continued)

(58) Field of Classification Search
CPC . H04W 36/0044; H04W 28/16; H04W 28/24; H04W 36/0072; H04W 36/08; H04W 36/14; H04W 92/20
(Continued)

(56) References Cited

U.S. PATENT DOCUMENTS

2010/0240385 A1* 9/2010 Lohr ................. H04W 36/0072
455/452.2
2011/0310850 A1 12/2011 Klingenbrunn et al.
(Continued)

FOREIGN PATENT DOCUMENTS

CN 102316540 A 1/2012
CN 102948215 A 2/2013
(Continued)

OTHER PUBLICATIONS

International Search Report for PCT/CN2017/087901 dated Aug. 30, 2017 and its English translation provided by WIPO.
(Continued)

*Primary Examiner* — Obaidul Huq
(74) *Attorney, Agent, or Firm* — Ladas & Parry, LLP (57) ABSTRACT

During the handover, a source base station transmits a handover request message carrying a QoS flow-based QoS parameter and/or a RB-based QoS parameter to a target base station. The target base station performs the admission control in accordance with the QoS flow-based QoS parameter or the RB-based QoS parameter, and transmits back to the source base station a handover request response message including information of a QoS flow or RB admitted successfully or unsuccessfully. The target base station performs, in accordance with the received information of the QoS flow, a convergence operation on the QoS flows which have a same QoS requirement, and generates a convergence mapping relationship from the QoS flows to the RBs and a
(Continued)

corresponding RB configuration parameter. In addition, the target base station transmits the information of the QoS flow having been admitted to a core network.

17 Claims, 7 Drawing Sheets

(51) Int. Cl.
    *H04W 36/14*     (2009.01)
    *H04W 28/24*     (2009.01)
    *H04W 28/16*     (2009.01)
    *H04W 92/20*     (2009.01)

(52) U.S. Cl.
    CPC ....... *H04W 36/0072* (2013.01); *H04W 36/08* (2013.01); *H04W 36/14* (2013.01); *H04W 92/20* (2013.01)

(58) Field of Classification Search
    USPC .................................. 370/310, 328, 329, 331
    See application file for complete search history.

(56) References Cited

U.S. PATENT DOCUMENTS

| | | |
|---|---|---|
| 2011/0310851 A1 | 12/2011 | Klingenbrunn et al. |
| 2015/0208309 A1* | 7/2015 | Taneja .............. H04W 12/0602 455/426.1 |
| 2016/0029289 A1* | 1/2016 | Wang ..................... H04B 7/155 370/315 |
| 2017/0034749 A1 | 2/2017 | Chandraouli et al. |
| 2017/0171787 A1* | 6/2017 | Fu ..................... H04W 74/0833 |
| 2019/0058997 A1 | 2/2019 | Futaki et al. |
| 2019/0191348 A1 | 6/2019 | Futaki et al. |

FOREIGN PATENT DOCUMENTS

| | | |
|---|---|---|
| CN | 102948216 A | 2/2013 |
| JP | 2015156676 A | 8/2015 |
| JP | 2016158280 A | 9/2016 |
| JP | 2016158282 A | 9/2016 |
| WO | 2014098393 A1 | 6/2014 |
| WO | 2015160329 A1 | 10/2015 |
| WO | 2016003113 A1 | 1/2016 |
| WO | 2018029930 A1 | 6/2019 |
| WO | 2018029931 A1 | 6/2019 |

OTHER PUBLICATIONS

Written Opinion for PCT/CN2017/087901 dated Aug. 30, 2017 and its English translation provided by Google Translate.
Written Opinion of the International Searching Authority from PCT/CN2017/087901, dated Aug. 30, 2017, with English translation from WIPO.
International Preliminary Report on Patentability from PCT/CN2017/087901, dated Feb. 12, 2019, with English translation from WIPO.
First Office Action and Search Report from CN app. No. 201610663580.1, dated Dec. 28, 2018, with English translation from Global Dossier.
Extended European Search Report from EP app. No. 17838427.7, dated Mar. 25, 2019.
"Control plane for support of NR standalone operation", R1-163468, 3GPP TSG RAN WG2 Meeting #94, Nanjing, China, May 23-27, 2016.
"QoS considerations in Handover procedure", R3-162958, 3GPP TSG-RAN3 Meeting #94, Reno, Nevada, USA, Nov. 14-18, 2016.
Notice of Reasons for Refusal from JP app. No. 2019-506666, dated Jan. 8, 2020, with English translation from Global Dossier.
"Introduction of Dual Connectivity" R3-143095, 3GPP TSG-RAN WG3 Meeting #86, San Francisco, USA, Nov. 17-21, 2014.
Notification of Reason for Refusal from KR app. No. 10-2019-7007268, dated Jul. 10, 2020, with English translation from Global Dossier.
"QoS handling of offloaded bearer in LWA", R2-154371, 3GPP TSG-RAN2 Meeting #91bis, Malmo, Sweden, Oct. 5-9, 2015.

* cited by examiner

METHOD AND DEVICE FOR PROCESSING QUALITY OF SERVICE PARAMETER IN HANDOVER SCENARIO

CROSS-REFERENCE TO RELATED APPLICATION

The present application is the U.S. national phase of PCT/CN2017/087901 filed on Jun. 12, 2017, which claims a priority of the Chinese patent application No. 201610663580.1 filed on Aug. 12, 2016, which are incorporated herein by reference in their entireties.

TECHNICAL FIELD

The present disclosure relates to the field of communication technology, in particular to a method and a device for processing a Quality of Service (QoS) parameter in a handover scenario.

BACKGROUND

Figure 1:
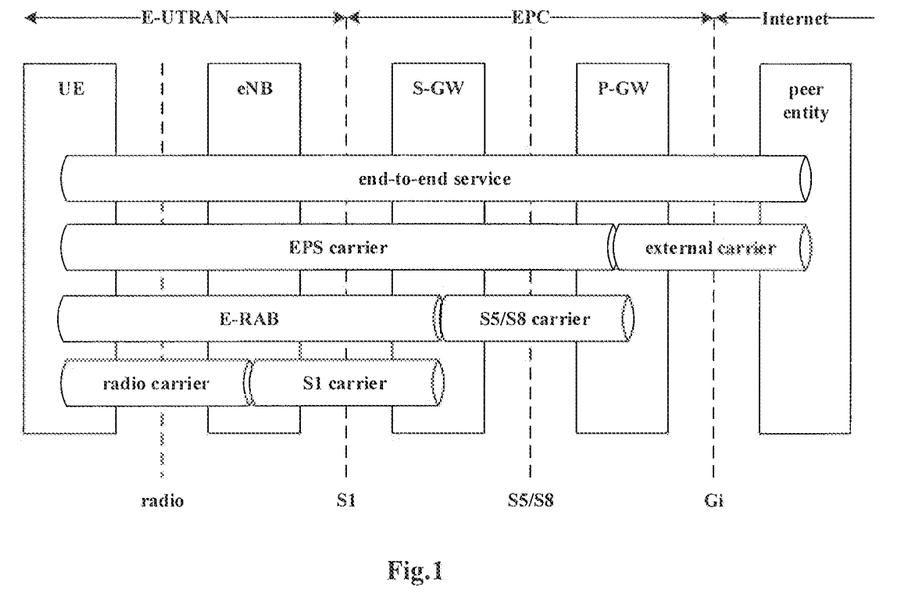
FIG. 1 is a schematic view showing a carrier model for a LTE system in related art.

FIG. 1 shows a carrier model for a Long Term Evolution (LTE) system in related art. A core network control plane function entity CN-C (Core Network-Control) in the LTE system generates a QoS parameter for an Evolved Radio Access Bearer (E-RAB). Air-interface Radio Bearers (RBs) are mapped to the E-RABs in a one-to-one correspondence manner, so the QoS parameter for the E-RAB generated by the core network control plane function entity is directly adopted as a QoS parameter for the air-interface RB.

Due to a heterogeneous access technology for a mobile communication network, it is necessary for the core network control plane function entity to support various tunneling protocols. e.g., General Packet Radio Service (GPRS) Tunneling Protocol (GTP) and Proxy Mobile Internet Protocol (PMIP), so as to support mobility and guarantee QoS. When the various tunneling protocols are supported by a $5^{th}$-Generaton (5G) network with a control function and a forwarding function separated from each other, complex control logics and signaling interaction may be provided, and thereby the system performance may be adversely affected. Hence, for the 5G network, QoS support enhancement at a general forwarding plane, e.g., simplifying a forwarding protocol, optimizing a QoS scheduling policy or enhancing a packet forwarding capability at the forwarding plane, may be taken into consideration. Due to the long-term existence of the LTE network, for a connection management mechanism in the future 5G network, the compatibility with the connection access to an Evolved Packet System (EPS) also needs to be taken into consideration. It is still probably necessary for the connection management mechanism to provide an interoperability management function, so as to process a tunneling management message in the LTE network, and perform a tunneling management procedure.

The control plane function entity of the future 5G core network does not include any bearers. The QoS parameters issued by the core network control plane function entity CN-C to a Next Generation-Node B (NG-NB) are configured at a flow-based granularity level. In addition, the access network NG-NB performs the QoS management at a RB-based granularity level, so it is necessary for the access network to generate the QoS parameter at a RB level for an interaction procedure between the NG-NB and a User Equipment (UE) or between the NG-NB and another radio access entity.

The research of the 5G technology is still at an early stage, and there is currently no scheme for a new QoS mechanism during the handover.

SUMMARY

An object of the present disclosure is to provide a method and a device for processing a QoS parameter in a handover scenario, so as to process the QoS in the handover scenario.

In one aspect, the present disclosure provides in some embodiments a method for processing a QoS parameter in a handover scenario, including transmitting, by a source base station, a handover request message to a target base station. The handover request message includes a QoS flow-based QoS parameter and/or a RB-based QoS parameter. The QoS flow-based QoS parameter or the RB-based QoS parameter is configured to be adopted by the target base station to perform admission control.

In a possible embodiment of the present disclosure, the handover request message further includes: a mapping relationship from QoS flows to RBs generated by the source base station.

In a possible embodiment of the present disclosure, the method further includes: receiving, by the source base station, a handover response message transmitted from the target base station. The handover response message includes information of a RB or information of a QoS flow admitted successfully or unsuccessfully by the target base station.

In another aspect, the present disclosure provides in some embodiments a method for processing a QoS parameter in a handover scenario, including: receiving, by a target base station, a handover request message transmitted from a source base station, the handover request message including a QoS flow-based QoS parameter and/or a RB-based QoS parameter; and performing, by the target base station, admission control in accordance with the QoS flow-based QoS parameter or the RB-based QoS parameter.

In a possible embodiment of the present disclosure, the method further includes: generating, by the target base station in accordance with the QoS flow-based QoS parameter, a convergence mapping relationship from QoS flows of the target base station to RBs, and a corresponding RB configuration parameter.

In a possible embodiment of the present disclosure, the handover request message further includes: a mapping relationship from QoS flows to RBs generated by the source base station. The method further includes: generating, by the target base station in accordance with the mapping relationship from the QoS flows to the RBs generated by the source base station, a convergence mapping relationship from QoS flows of the target base station to RBs, and a corresponding RB configuration parameter.

In a possible embodiment of the present disclosure, the method further includes: transmitting, by the target base station, a handover request response message to the source base station, wherein the handover request response message includes information of a RB or information of a QoS flow admitted successfully or unsuccessfully by the target base station.

In a possible embodiment of the present disclosure, the method further includes: transmitting, by the target base station, a transmission path switch message to a core network control plane function entity, wherein the transmission path switch message carries information of the QoS flow having been admitted; and receiving, by the target base station, a transmission path switch confirmation message transmitted from the core network control plane function entity.

In yet another aspect, the present disclosure provides in some embodiments a method for processing a QoS parameter in a handover scenario, including: transmitting, by a core network control plane function entity, a handover request message to a target base station. The handover request message includes a QoS flow-based QoS parameter and/or a RB-based QoS parameter, and the QoS flow-based QoS parameter or the RB-based QoS parameter is configured to be adopted by the target base station to perform admission control.

In a possible embodiment of the present disclosure, the method further includes: receiving, by the core network control plane function entity, a handover request acknowledge message transmitted from the target base station, the handover request acknowledge message including information of a RB or information of a QoS flow admitted successfully or unsuccessfully by the target base station; and transmitting, by the core network control plane function entity, a handover command to a source base station.

In still yet another aspect, the present disclosure provides in some embodiments a method for processing a QoS parameter in a handover scenario, including: receiving, by a target base station, a handover request message transmitted from a core network control plane function entity, the handover request message including a QoS flow-based QoS parameter and/or a RB-based QoS parameter; and performing, by the target base station, admission control in accordance with the QoS flow-based QoS parameter or the RB-based QoS parameter.

In a possible embodiment of the present disclosure, the method further includes: generating, by the target base station in accordance with the QoS flow-based QoS parameter, a convergence mapping relationship from QoS flows of the target base station to RBs, and a corresponding RB configuration parameter.

In a possible embodiment of the present disclosure, the handover request message further includes: a mapping relationship from QoS flows to RBs generated by the source base station. The method further includes: generating, by the target base station in accordance with the mapping relationship from the QoS flows to the RBs generated by the source base station, a convergence mapping relationship from QoS flows of the target base station to RBs, and a corresponding RB configuration parameter In a possible embodiment of the present disclosure, the method further includes: transmitting, by the target base station, a handover confirmation message to the core network control plane function entity. The handover request acknowledge message includes information of a RB or information of a QoS flow admitted successfully or unsuccessfully by the target base station.

In still yet another aspect, the present disclosure provides in some embodiments a source base station, including: a first transmission module configured to transmit a handover request message to a target base station. The handover request message includes a QoS flow-based QoS parameter and/or a RB-based QoS parameter. The QoS flow-based QoS parameter or the RB-based QoS parameter is configured to be adopted by the target base station to perform admission control.

In a possible embodiment of the present disclosure, the handover request message further includes a mapping relationship from QoS flows to RBs generated by the source base station.

In a possible embodiment of the present disclosure, the source base station further includes: a first reception module configured to receive a handover response message transmitted from the target base station. The handover response message includes information of a RB or information of a QoS flow admitted successfully or unsuccessfully by the target base station.

In still yet another aspect, the present disclosure provides in some embodiments a target base station, including: a second reception module configured to receive a handover request message transmitted from a source base station, the handover request message including a QoS flow-based QoS parameter and/or a RB-based QoS parameter; and a first admission control module configured to perform admission control in accordance with the QoS flow-based QoS parameter or the RB-based QoS parameter In a possible embodiment of the present disclosure, the target base station further includes: a first generation module configured to generate, in accordance with the QoS flow-based QoS parameter, a convergence mapping relationship from QoS flows of the target base station to RBs, and a corresponding RB configuration parameter.

In a possible embodiment of the present disclosure, the handover request message further includes: a mapping relationship from QoS flows to RBs generated by the source base station. The target base station further includes: a second generation module configured to generate, in accordance with the mapping relationship from the QoS flows to the RBs generated by the source base station, a convergence mapping relationship from QoS flows of the target base station to RBs, and a corresponding RB configuration parameter.

In a possible embodiment of the present disclosure, the target base station further includes: a second transmission module configured to transmit a handover request response message to the source base station. The handover request response message includes information of a RB or information of a QoS flow admitted successfully or unsuccessfully by the target base station.

In a possible embodiment of the present disclosure, the target base station further includes: a sixth transmission module configured to transmit a transmission path switch message to a core network control plane function entity, wherein the transmission path switch message carries information of the QoS flow having been admitted; and a fifth reception module configured to receive a transmission path switch confirmation message transmitted from the core network control plane function entity.

In still yet another aspect, the present disclosure provides in some embodiments a core network control plane function entity, including: a third transmission module configured to transmit a handover request message to a target base station. The handover request message includes a QoS flow-based QoS parameter and/or a RB-based QoS parameter, and the QoS flow-based QoS parameter or the RB-based QoS parameter is configured to be adopted by the target base station to perform admission control.

In a possible embodiment of the present disclosure, the core network control plane function entity further includes: a third reception module configured to receive a handover request acknowledge message transmitted from the target base station, the handover request acknowledge message including information of a RB or information of a QoS flow admitted successfully or unsuccessfully by the target base station; and a fourth transmission module configured to transmit a handover command to a source base station.

In still yet another aspect, the present disclosure provides in some embodiments a target base station, including: a fourth reception module configured to receive a handover request message transmitted from a core network control plane function entity, the handover request message including a QoS flow-based QoS parameter and/or a RB-based QoS parameter; and a second admission control module configured to perform admission control in accordance with the QoS flow-based QoS parameter or the RB-based QoS parameter.

In a possible embodiment of the present disclosure, the target base station further includes: a third generation module configured to generate, in accordance with the QoS flow-based QoS parameter, a convergence mapping relationship from QoS flows of the target base station to RBs, and a corresponding RB configuration parameter.

In a possible embodiment of the present disclosure, the handover request message further includes: a mapping relationship from QoS flows to RBs generated by the source base station. The target base station further includes: a fourth generation module configured to generate, in accordance with the mapping relationship from the QoS flows to the RBs generated by the source base station, a convergence mapping relationship from QoS flows of the target base station to RBs, and a corresponding RB configuration parameter.

In a possible embodiment of the present disclosure, the target base station further includes: a fifth transmission module configured to transmit a handover confirmation message to the core network control plane function entity. The handover request acknowledge message includes information of a RB or information of a QoS flow admitted successfully or unsuccessfully by the target base station.

In still yet another aspect, the present disclosure further provides in some embodiments a source base station, including a processor, a memory and a transceiver. The processor is configured to read a program stored in the memory, so as to: transmit through the transceiver a handover request message to a target base station. The handover request message includes a QoS flow-based QoS parameter and/or a RB-based QoS parameter, and the QoS flow-based QoS parameter or the RB-based QoS parameter is configured to be adopted by the target base station to perform admission control. The transceiver is configured to receive and transmit data. The memory is configured to store therein data for the operation of the processor.

In still yet another aspect, the present disclosure provides in some embodiments a target base station, including a processor, a memory and a transceiver. The processor is configured to read a program stored in the memory, so as to: receive through the transceiver a handover request message transmitted from a source base station, the handover request message including a QoS flow-based QoS parameter and/or a RB-based QoS parameter; and perform admission control in accordance with the QoS flow-based QoS parameter or the RB-based QoS parameter. The transceiver is configured to receive and transmit data. The memory is configured to store therein data for the operation of the processor.

In still yet another aspect, the present disclosure provides in some embodiments a core network control plane function entity, including a processor, a memory and a transceiver. The processor is configured to read a program stored in the memory, so as to transmit through the transceiver a handover request message to a target base station. The handover request message includes a QoS flow-based QoS parameter and/or a RB-based QoS parameter, and the QoS flow-based QoS parameter or the RB-based QoS parameter is configured to be adopted by the target base station to perform admission control. The transceiver is configured to receive and transmit data. The memory is configured to store therein data for the operation of the processor.

In still yet another aspect, the present disclosure provides in some embodiments a target base station, including a processor, a memory and a transceiver. The processor is configured to read a program stored in the memory, so as to: receive through the transceiver a handover request message transmitted from a core network control plane function entity, the handover request message including a QoS flow-based QoS parameter and/or a RB-based QoS parameter; and perform admission control in accordance with the QoS flow-based QoS parameter or the RB-based QoS parameter. The transceiver is configured to receive and transmit data. The memory is configured to store therein data for the operation of the processor.

According to the embodiments of the present disclosure, during the handover, the source base station may transmit the handover request message carrying the QoS flow-based QoS parameter and/or the RB-based QoS parameter to the target base station. Then, the target base station may perform the admission control in accordance with the QoS flow-based QoS parameter or the RB-based QoS parameter, and transmit back to the source base station the handover request response including the information of the QoS flow or RB admitted successfully or unsuccessfully. The target base station may perform, in accordance with the received information of the QoS flow, a convergence operation on the QoS flows which have a same QoS requirement, and generate the convergence mapping relationship from the QoS flows to the RBs and the corresponding RB configuration parameter. The target base station may transmit the information of the QoS flow having been admitted to a core network. As a result, it is able to process the QoS parameter in the handover scenario.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure for a person skilled in the art.

It should be appreciated that, the present disclosure may be implemented as a system, an apparatus, a device, a method or a computer program product. Hence, the present disclosure may be implemented in the form of full hardware, full software (including firmware, resident software, microcode, or the like), or a combination of the hardware and the software.

The scheme in the embodiments of the present disclosure may be applied to different network deployment structures. For ease of description, two possible network deployment structures for a future mobile communication system will be described hereinafter.

Deployment structure 1: base station and UE

Figure 2:
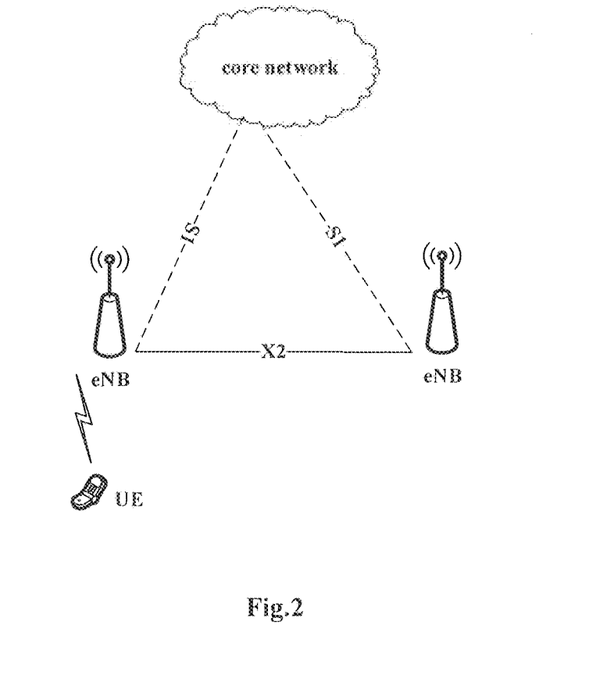
FIG. 2 is a schematic view showing a typical LTE architecture.

FIG. 2 shows a typical LTE architecture, an evolved Node B (eNB) may include a plurality of cells, and a User Equipment (UE) in a connected state transmits data to, and receives data from, a corresponding cell via an air interface.

Deployment structure 2: network side node and UE side node

The network side node includes a Central Unit (CU) and a Distributed Unit (DU), and the UE side node is a UE.

Figure 3:
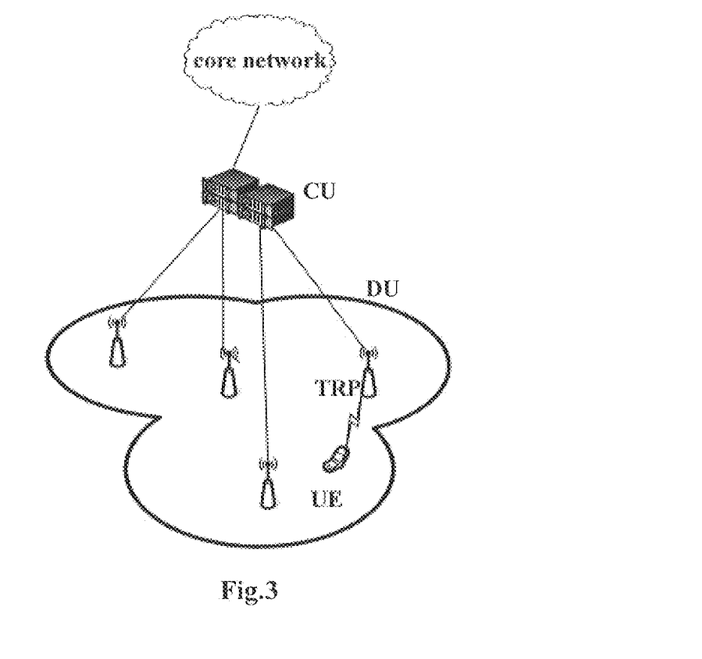
FIG. 3 is a schematic view showing a future mobile communication architecture.

FIG. 3 shows a future mobile communication architecture. The network side node includes a CU and DUs. The CU is configured to control a plurality of DUs deployed in a certain region, and data is transmitted between the plurality of DUs and the UE through a Transmission Reception Point (TRP) via the air interface. The UE may be served by one or more TRPs at the same time, so as to perform the data transmission.

The scheme in the embodiments of the present disclosure may be applied to the above-mentioned two types of Radio Access Network (RAN) architecture. For ease of description, regardless of the eNB in the deployment structure 1 or the CU/DU in the deployment structure 2 (with the TRP), radio signaling or data transmission reception points at a network side are collectively called as base stations (NG-NBs).

Figure 4:
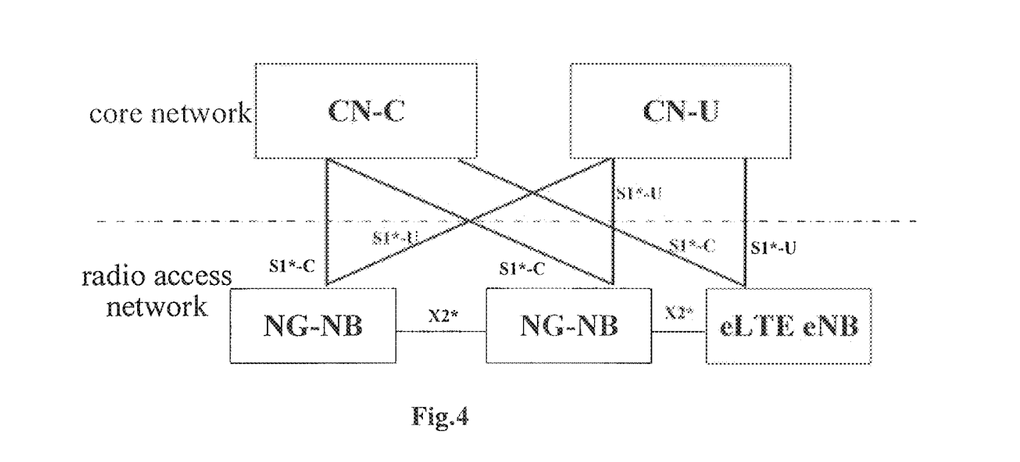
FIG. 4 is a schematic view showing 5G network architecture.

FIG. 4 shows 5G network architecture, which includes three logic entities, e.g., a core network control plane function entity CN-C and a core network user plane function entity CN-U (Core Network-User) located in a core network, and a NG-NB and an evolved LTE (eLTE) eNB located in an access network. An S1*-C interface is established between the CN-C and the NG-NB so as to transmit control-plane signaling. An S1*-U interface is established between the CN-U and the NG-NB so as to transmit user-plane data. An X2* interface is established between the NG-NBs of the radio access network, and the X2* interface supports a control-plane (e.g., X2*-C) and a user-plane function (e.g., X2*-U).

A control-plane connection at a UE-based granularity level may be established through the S1*-C (the control-plane connection corresponding to each EU may be identified through the S1*-AP ID), and a user-plane connection (also called as user-plane tunnel) at a Protocol Data Unit (PDU) session-based granularity level may be established through the S1*-U. It is merely able for one UE to maintain one S1*-C connection with the CN-C, but may establish simultaneously a plurality of user-plane connections at the PDU session-based granularity level with the CN-U through the S1*-U interface. The UE may be served by one or more NG-NBs simultaneously in a radio access network.

Figure 5:
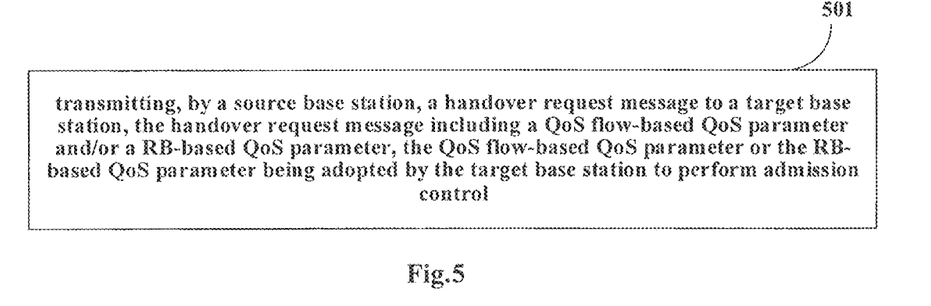
FIG. 5 is a flow chart of a method for processing a QoS parameter in a handover scenario according to some embodiments of the present disclosure.

The present disclosure provides in some embodiments a method for processing a QoS Parameter in a handover scenario which, as shown in FIG. 5, includes Step 501 of transmitting, by a source base station, a handover request message to a target base station. The handover request message may include a QoS flow-based QoS parameter and/or a RB-based QoS parameter. The QoS flow-based QoS parameter or the RB-based QoS parameter may be adopted by the target base station to perform admission control.

In the embodiment of the present disclosure, the source base station and the target base station may correspond to two different eNBs in FIG. 2 respectively, or two different TRPs in FIG. 3 respectively.

In a possible embodiment of the present disclosure, the handover request message further includes a mapping relationship from QoS flows to RBs generated by the source base station.

In a possible embodiment of the present disclosure, the method further includes receiving, by the source base station, a handover response message from the target base station. The handover response message includes information of the RB or QoS flow admitted successfully or unsuccessfully by the target base station.

According to the embodiments of the present disclosure, during the handover, the source base station may transmit the handover request message carrying the QoS flow-based QoS parameter and/or the RB-based QoS parameter to the target base station. The target base station may perform the admission control in accordance with the QoS flow-based QoS parameter or the RB-based QoS parameter, and transmit back the handover request response including the information of the QoS flow or RB admitted successfully and/or unsuccessfully to the source base station. The target base station may converge the QoS flows that have the same QoS requirement in accordance with the received information of the QoS flow, and generate a convergence mapping relationship from QoS flows to RBs and a corresponding RB configuration parameter. In addition, the target base station may transmit the information of the QoS flow having been admitted to a core network.

It should be appreciated that, the source base station may enable the handover request message to also carry a mapping relationship from the QoS flows to the RBs generated by the source base station. The target base station may generate its own mapping relationship from the QoS flows to the RBs and the corresponding configuration parameter with reference to the mapping relationship from the QoS flows to the RBs generated by the source base station.

Figure 6:
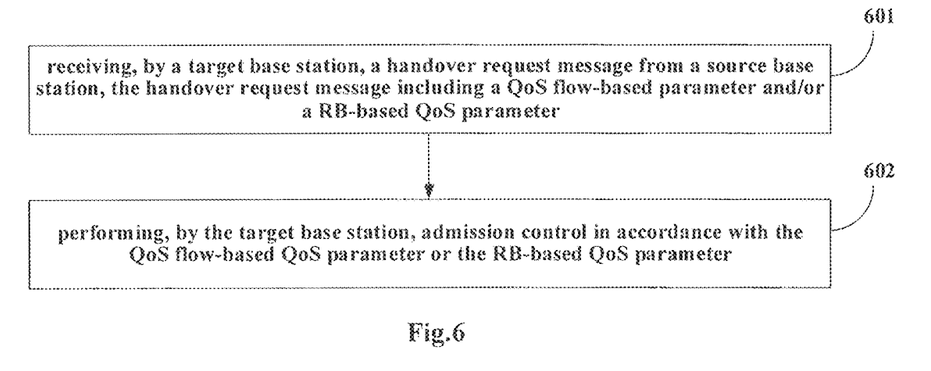
FIG. 6 is another flow chart of a method for processing a QoS parameter in a handover scenario according to some embodiments of the present disclosure.

The present disclosure further provides in some embodiments a method for processing a QoS parameter in a handover scenario which, as shown in FIG. 6, includes: Step 601 of receiving, by a target base station, a handover request message from a source base station, the handover request message including a QoS flow-based QoS parameter and/or a RB-based QoS parameter; and Step 602 of performing, by the target base station, admission control in accordance with the QoS flow-based QoS parameter or the RB-based QoS parameter.

In a possible embodiment of the present disclosure, the method further includes generating, by the target base station, a convergence mapping relationship from QoS flows to RBs of the target base station and a corresponding RB configuration parameter in accordance with the QoS flow-based QoS parameter.

In a possible embodiment of the present disclosure, the handover request message may further include a mapping relationship from QoS flows to RBs generated by the source base station. The method may further include generating, by the target base station, the convergence mapping relationship from the QoS flows to the RBs of the target base station and the corresponding RB configuration parameter in accordance with the mapping relationship from the QoS flows to the RBs generated by the source base station.

In a possible embodiment of the present disclosure, the method may further include transmitting, by the target base station, a handover request response message to the source base station, and the handover request response message includes information of the RB or QoS flow admitted successfully or unsuccessfully by the target base station.

In a possible embodiment of the present disclosure, the method may further include: transmitting, by the target base station, a transmission path switch message carrying the information of the QoS flow having been admitted to a core network control plane function entity; and receiving, by the target base station, a transmission path switch confirmation message from the core network control plane function entity.

According to the embodiments of the present disclosure, during the handover, the source base station may transmit the handover request message carrying the QoS flow-based QoS parameter and/or the RB-based QoS parameter to the target base station. The target base station may perform the admission control in accordance with the QoS flow-based QoS parameter or the RB-based QoS parameter, and transmit back the handover request response including the information of the QoS flow or RB admitted successfully and/or unsuccessfully to the source base station. The target base station may converge the QoS flows that have the same QoS requirement in accordance with the received information of the QoS flow, and generate the convergence mapping relationship from the QoS flows to the RBs and the corresponding RB configuration parameter. In addition, the target base station may transmit the information of the QoS flow having been admitted to a core network.

It should be appreciated that, the source base station may enable the handover request message to also carry a mapping relationship from the QoS flows to the RBs generated by the source base station. The target base station may generate its own mapping relationship from the QoS flows to the RBs and the corresponding RB configuration parameter with reference to the mapping relationship from the QoS flows to the RBs generated by the source base station.

Figure 7:
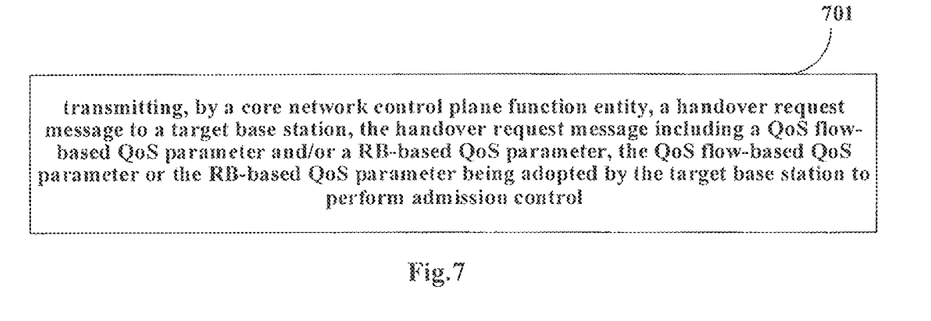
FIG. 7 is yet another flow chart of a method for processing a QoS parameter in a handover scenario according to some embodiments of the present disclosure.

The present disclosure further provides in some embodiments a method for processing a QoS parameter in a handover scenario which, as shown in FIG. 7, includes Step 701 of transmitting, by a core network control plane function entity, a handover request message to a target base station. The handover request message may include a QoS flow-based QoS parameter and/or a RB-based QoS parameter. The QoS flow-based QoS parameter or the RB-based QoS parameter may be adopted by the target base station to perform admission control.

In a possible embodiment of the present disclosure, the method may further include: receiving, by the core network control plane function entity, a handover request acknowledge message from the target base station, the handover request configuration message including information of a QoS flow or a RB admitted successfully or unsuccessfully by the target base station; and transmitting, by the core network control plane function entity, a handover command to a source base station.

According to the embodiments of the present disclosure, the source base station (i.e., the source NG-NB) may transmit a handover preparation request message to the core network control plane function entity (e.g., the 5G CN-C), and the handover preparation message may carry the mapping relationship from the QoS flows to the RBs generated by the source station and the RB-based QoS parameter. The mapping relationship and the RB-based QoS parameter are transparent to a core network, so they may be passed through the core network control plane function entity to the target base station (I.e., the target NG-NB). Then, the core network control plane function entity may transmit the handover request message to the target base station, and the handover request message may carry the QoS flow-based QoS parameter and the information passed through the core network control plane function entity to the target base station from the source base station. The target base station may perform the admission control in accordance with the QoS flow-based QoS parameter or the RB-based QoS parameter, transmit back a handover request acknowledge request carrying information of the QoS flow admitted successfully and unsuccessfully to the core network control plane function entity, and transmit the handover request acknowledge request carrying information of the RB admitted unsuccessfully to the target NG-NB (the information of the RB admitted unsuccessfully is transparent to the core network). The target base station may converge the QoS flows which have the same QoS requirement, and generate a convergence mapping relationship from the QoS flows to the RBs and a corresponding RB configuration parameter. When a mapping relationship from the QoS flows to the RBs is carried in the source base station, the target base station may generate its own convergence mapping relationship from the QoS flows to the RBs and the corresponding configuration parameter with reference to the mapping relationship from the QoS flows to the RBs. The core network control plane function entity may transmit the handover command carrying the information of the QoS flow admitted unsuccessfully by the target side to the source base station.

Figure 8:
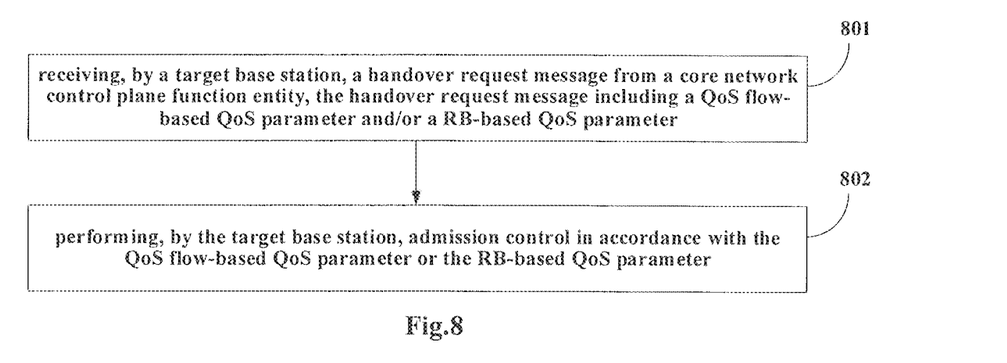
FIG. 8 is still yet another flow chart of a method for processing a QoS parameter in a handover scenario according to some embodiments of the present disclosure.

The present disclosure further provides in some embodiments a method for processing a QoS parameter in a handover scenario which, as shown in FIG. 8, includes: Step 801 of receiving, by a target base station, a handover request message from a core network control plane function entity, the handover request message including a QoS flow-based QoS parameter and/or a RB-based QoS parameter; and Step 802 of performing, by the target base station, admission control in accordance with the QoS flow-based QoS parameter or the RB-based QoS parameter.

In a possible embodiment of the present disclosure, the method may further include generating, by the target base station, a convergence mapping relationship from QoS flows to RBs of the target base station and a corresponding RB configuration parameter in accordance with the QoS flow-based QoS parameter.

In a possible embodiment of the present disclosure, the handover request message may further include a mapping relationship from QoS flows to RBs generated by a source base station. The method may further include generating, by the target base station, the convergence mapping relationship from the QoS flows to the RBs of the target base station and the corresponding RB configuration parameter in accordance with the mapping relationship from the QoS flows to the RBs generated by the source base station.

In a possible embodiment of the present disclosure, the method may further include transmitting, by the target base station, a handover confirmation message to the core network control plane function entity, and the handover confirmation request message includes information of the RB or QoS flow admitted successfully or unsuccessfully by the target base station.

According to the embodiments of the present disclosure, the source base station (i.e., the source NG-NB) may transmit a handover preparation request message to the core network control plane function entity (e.g., the 5G CN-C), and the handover preparation message may carry the mapping relationship from the QoS flows to the RBs generated by the source station and the RB-based QoS parameter. The mapping relationship and the RB-based QoS parameter are transparent to a core network, so they may be passed through the core network control plane function entity to the target base station (i.e., the target NG-NB). Then, the core network control plane function entity may transmit the handover request message to the target base station, and the handover request message may carry the QoS flow-based QoS parameter and the information passed through the core network control plane function entity to the target base station from the source base station. The target base station may perform the admission control in accordance with the QoS flow-based QoS parameter or the RB-based QoS parameter, transmit back a handover request acknowledge request carrying information of the QoS flow admitted successfully and unsuccessfully to the core network control plane function entity, and transmit the handover request acknowledge request carrying information of the RB admitted unsuccessfully to the target NG-NB (the information of the RB admitted unsuccessfully is transparent to the core network). The target base station may converge the QoS flows which have the same QoS requirement, and generate a convergence mapping relationship from the QoS flows to the RBs and a corresponding RB configuration parameter. When a mapping relationship from the QoS flows to the RBs is carried in the source base station, the target base station may generate its own convergence mapping relationship from the QoS flows to the RBs and the corresponding configuration parameter with reference to the mapping relationship from the QoS flows to the RBs. The core network control plane function entity may transmit the handover command carrying the information of the QoS flow admitted unsuccessfully by the target side to the source base station.

Figure 9:
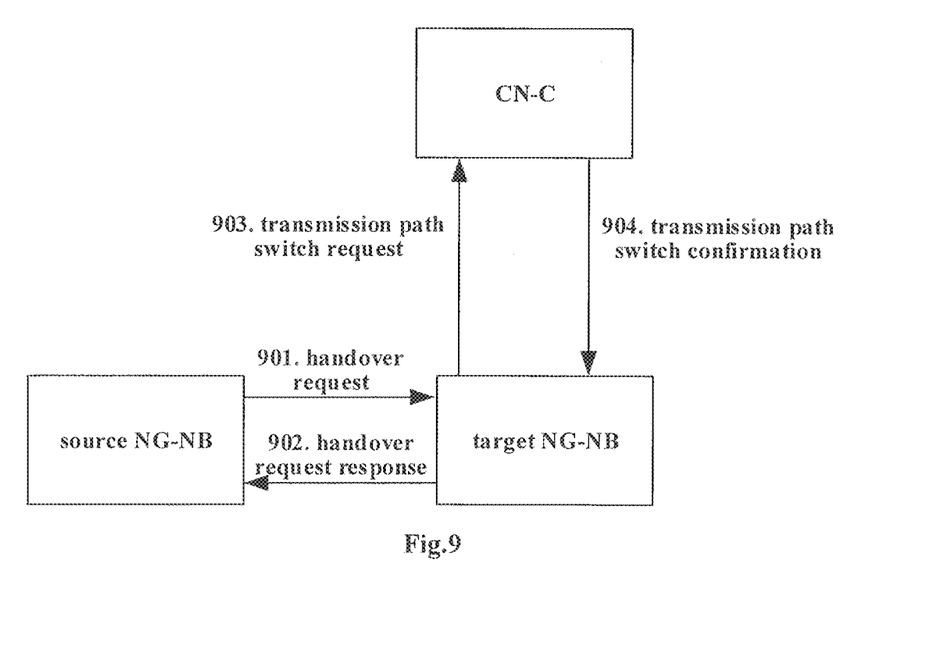
FIG. 9 is a schematic view showing a procedure of processing the QoS parameter based on QoS flow admission according to some embodiments of the present disclosure.

FIG. 9 shows a procedure of processing the QoS parameter based on the QoS flow admission. In this embodiment, there is a direct interface between the NG-NB and the NG-NB. To be specific, the procedure may include the following steps.

Step 901: the source NG-NB may transmit the handover request message to the target NG-NB, and the handover request message may carry the QoS flow-based QoS parameter, and/or the mapping relationship from the QoS flows to the RBs generated by the source base station.

Step 902: the target NG-NB may perform the admission control in accordance with the QoS flow-based QoS parameter, and transmit back the handover request response message carrying the information of the QoS flow admitted successfully or unsuccessfully to the source base station. The target NG-NB may converge the QoS flows which have the same QoS requirement, and generate the convergence mapping relationship from the QoS flows to the RBs and the corresponding RB configuration parameter. When the mapping relationship from the QoS flows to the RBs is carried in the source NG-NB, the target NG-NB may generate its own convergence mapping relationship from the QoS flows to the RBs and the corresponding RB configuration parameter with reference to the mapping relationship in the source NG-NB.

Step 903: the target NG-NB may transmit the transmission path switch message carrying the information of the QoS flow admitted successfully to the 5G CN-C.

Step 904: the 5G CN-C may transmit back the transmission path switch confirmation message carrying the information of the QoS flow confirmed to be switched to the target NG-NB.

Figure 10:
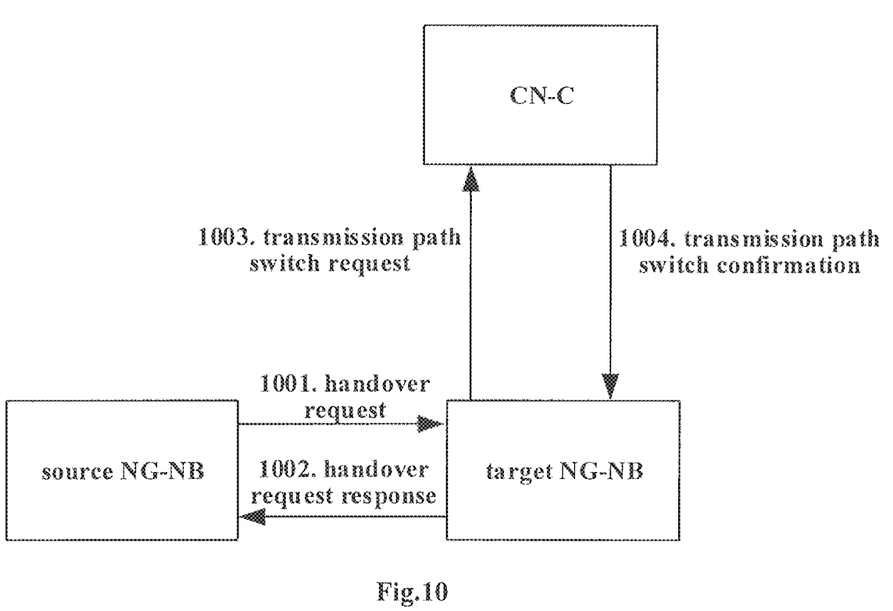
FIG. 10 is a schematic view showing a procedure of processing the QoS parameter based on RB admission according to some embodiments of the present disclosure.

FIG. 10 shows a procedure of processing the QoS parameter based on the RB admission. In this embodiment, there is a direct interface between the NG-NBs. To be specific, the procedure may include the following steps.

Step 1001: the source NG-NB may transmit the handover request message to the target NG-NB. The handover request message may carry the RB-based QoS parameter and the QoS flow-based QoS parameter, and/or the mapping relationship from the QoS flows to the RBs generated by the source base station.

Step 1002: the target NG-NB may perform the admission control in accordance with the RB-based QoS parameter, and transmit back the handover request response message carrying the information of the RB admitted successfully or unsuccessfully to the source base station. The target NG-NB may converge the QoS flows which have the same QoS requirement in accordance with the received information of the QoS flow, and generate the convergence mapping relationship from the QoS flows to the RBs and the corresponding RB configuration parameter. When the mapping relationship from the QoS flows to the RBs is carried in the source NG-NB, the target NG-NB may also generate its own convergence mapping relationship from the QoS flows to the RBs and the corresponding RB configuration parameter with reference to the mapping relationship in the source NG-NB.

Step 1003: the target NG-NB may transmit the transmission path switch message carrying the information of the flow admitted successfully to the 5G CN-C.

Step 1004: the 5G CN-C may transmit back the transmission path switch confirmation message carrying the information of the QoS flow confirmed to be switched to the target NG-NB.

Figure 11:
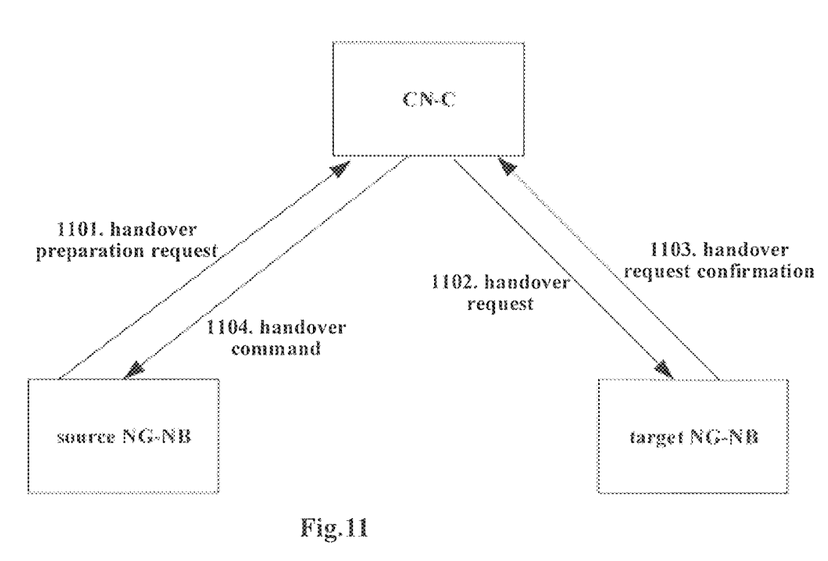
FIG. 11 is another schematic view showing the procedure of processing the QoS parameter based on QoS flow admission according to some embodiments of the present disclosure.

FIG. 11 shows a procedure of processing the QoS parameter based on the QoS flow admission. In this embodiment, there is no direct interface between the NG-NBs. To be specific, the procedure may include the following steps.

Step 1101: the source NG-NB may transmit the handover preparation request message to the 5G CN-C. The handover preparation request message may carry the mapping relationship from the QoS flows to the RBs generated by the source base station, and the mapping relationship may be transparent to the core network, so the mapping relationship may be passed through the core network to the target NG-NB.

Step 1102: the 5G CN-C may transmit the handover request message to the target NG-NB. The handover request message may carry the QoS flow-based QoS parameter and the information transmitted transparently to the target NG-NB from the source NG-NB.

Step 1103: the target NG-NB may perform the admission control in accordance with the QoS flow-based QoS parameter, and transmit back the handover request acknowledge message carrying the information of the QoS flow admitted successfully and unsuccessfully to the 5G CN-C. The target NG-NB may converge the QoS flows which have the same QoS requirement, and generate the convergence mapping relationship from the QoS flows to the RBs and the corresponding RB configuration parameter. When the mapping relationship from the QoS flows to the RBs is carried in the source base station, the target base station may generate its own, convergence mapping relationship from the QoS flows to the RBs and the corresponding configuration parameter with reference to the mapping relationship in the source base station.

Step 1104: the 5G CN-C may transmit the handover command carrying the information of the QoS flow admitted unsuccessfully by the target NG-NB to the source NG-NB.

Figure 12:
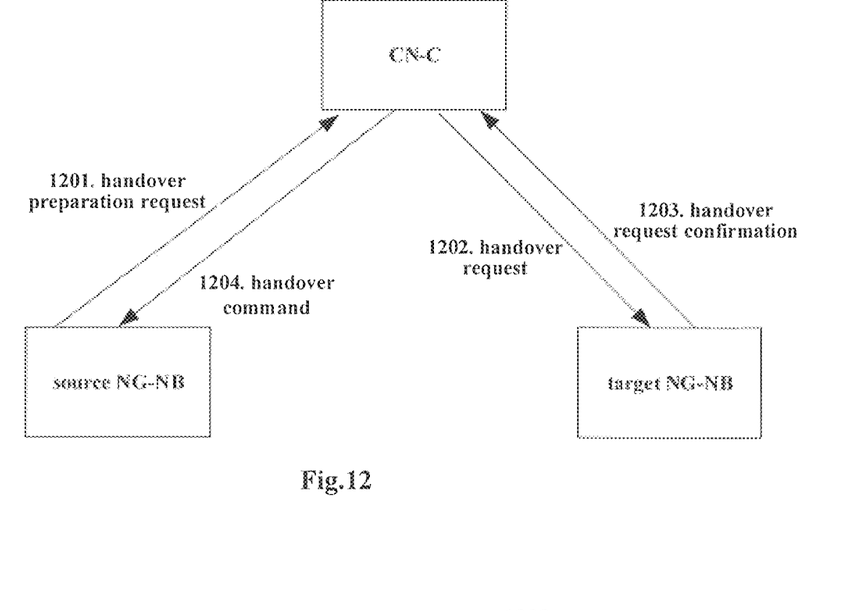
FIG. 12 is another schematic view showing the procedure of processing the QoS parameter based on RB admission according to some embodiments of the present disclosure.

FIG. 12 shows a procedure of processing the QoS parameter based on the RB admission. In this embodiment, there is no direct interface between the NG-NBs. To be specific, the procedure may include the following steps.

Step 1201: the source NG-NB may transmit the handover preparation request message to the 5G CN-C. The handover preparation request message may carry the RB-based QoS parameter, and/or the mapping relationship from the QoS flows to the RBs generated by the source base station. The RB-based QoS parameter and the mapping relationship may be transparent to the core network, so they may be passed through the core network to the target NG-NB.

Step 1202: the 5G CN-C may transmit the handover request message to the target NG-NB. The handover request message may carry the QoS flow-based QoS parameter and the information transmitted transparently from the 5G CN-C to the target NG-NB.

Step 1203: the target NG-NB may perform the admission control in accordance with the RB-based QoS parameter, and transmit back the handover request acknowledge message carrying the parameters of the flow admitted successfully and unsuccessfully and the information of the RB admitted unsuccessfully to the target NG-NB (the information is transparent to the core network). The target NG-NB may converge the QoS flows which have the same QoS requirement in accordance with the received information of the flow QoS, and generate the convergence mapping relationship from the QoS flows to the RBs and the corresponding RB configuration parameter. When the mapping relationship from the QoS flows to the RBs is carried in the source NG-NB, the target NG-NB may also generate its convergence mapping relationship from the QoS flows to the RBs and the corresponding configuration parameter with reference to the mapping relationship in the source NG-NB.

Step 1204: the 5G CN-C may transmit the handover command to the source NG-NB. The handover command may carry the information of the RB admitted unsuccessfully transmitted transparently to the source NG-NB from the target NG-NB.

Figure 13:
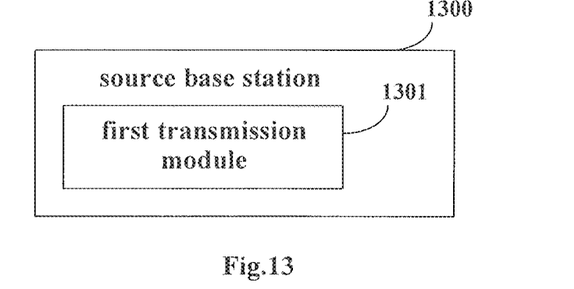
FIG. 13 is a schematic view showing a source base station according to some embodiments of the present disclosure.

The present disclosure further provides in some embodiments a source base station which, as shown in FIG. 13, includes a first transmission module 1301 configured to transmit a handover request message to a target base station. The handover request message may include a QoS flow-based QoS parameter and/or a RB-based QoS parameter. The QoS flow-based QoS parameter or the RB-based QoS parameter may be adopted by the target base station to perform admission control.

In a possible embodiment of the present disclosure, the handover request message may further include a mapping relationship from QoS flows to RBs generated by the source base station.

In a possible embodiment of the present disclosure, the source base station may further include a first reception module configured to receive a handover response message from the target base station. The handover response message may include information of the RB or QoS flow admitted successfully or unsuccessfully by the target base station.

According to the embodiments of the present disclosure, during the handover, the source base station may transmit the handover request message carrying the QoS flow-based QoS parameter and/or the RB-based QoS parameter to the target base station. The target base station may perform the admission control in accordance with the QoS flow-based QoS parameter or the RB-based QoS parameter, and transmit back the handover request response including the information of the QoS flow or RB admitted successfully and/or unsuccessfully to the source base station. The target base station may converge the QoS flows that have the same QoS requirement in accordance with the received information of the QoS flow, and generate a convergence mapping relationship from QoS flows to RBs and a corresponding RB configuration parameter. In addition, the target base station may transmit the information of the QoS flow having been admitted to a core network.

It should be appreciated that, the source base station may enable the handover request message to also carry a mapping relationship from the QoS flows to the RBs generated by the source base station. The target base station may generate its own mapping relationship from the QoS flows to the RBs and the corresponding configuration parameter with reference to the mapping relationship from the QoS flows to the RBs generated by the source base station.

Figure 14:
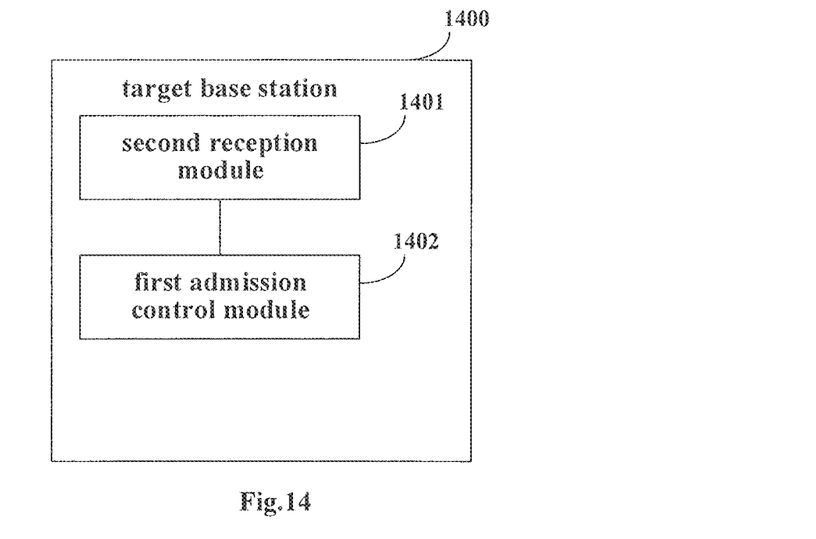
FIG. 14 is a schematic view showing a target base station according to some embodiments of the present disclosure.

The present disclosure further provides in some embodiments a target base station 1400 which, as shown in FIG. 14, includes: a second reception module 1401 configured to receive a handover request message from a source base station, the handover request message including a QoS flow-based QoS parameter and/or a RB-based QoS parameter; and a first admission control module 1402 configured to perform admission control in accordance with the QoS flow-based QoS parameter or the RB-based QoS parameter.

In a possible embodiment of the present disclosure, the target base station may further include a first generation module configured to generate a convergence mapping relationship from QoS flows to RBs of the target base station and a corresponding RB configuration parameter in accordance with the QoS flow-based QoS parameter.

In a possible embodiment of the present disclosure, the handover request message may further include a mapping relationship from QoS flows to RBs generated by the source base station. The target base station may further include a second generation module configured to generate the convergence mapping relationship from the QoS flows to the RBs of the target base station and the corresponding RB configuration parameter in accordance with the mapping relationship from the QoS flows to the RBs generated by the source base station.

In a possible embodiment of the present disclosure, the target base station may further include a second transmission module configured to transmit a handover request response message to the source base station, and the handover request response message includes information of the RB or QoS flow admitted successfully or unsuccessfully by the target base station.

According to the embodiments of the present disclosure, during the handover, the source base station may transmit the handover request message carrying the QoS flow-based QoS parameter and/or the RB-based QoS parameter to the target base station. The target base station may perform the admission control in accordance with the QoS flow-based QoS parameter or the RB-based QoS parameter, and transmit back the handover request response including the information of the QoS flow or RB admitted successfully and/or unsuccessfully to the source base station. The target base station may converge the QoS flows that have the same QoS requirement in accordance with the received information of the QoS flow, and generate the convergence mapping relationship from the QoS flows to the RBs and the corresponding RB configuration parameter. In addition, the target base station may transmit the information of the QoS flow having been admitted to a core network.

It should be appreciated that, the source base station may enable the handover request message to also carry a mapping relationship from the QoS flows to the RBs generated by the source base station. The target base station may generate its own mapping relationship from the QoS flows to the RBs and the corresponding RB configuration parameter with reference to the mapping relationship from the QoS flows to the RBs generated by the source base station.

Figure 15:
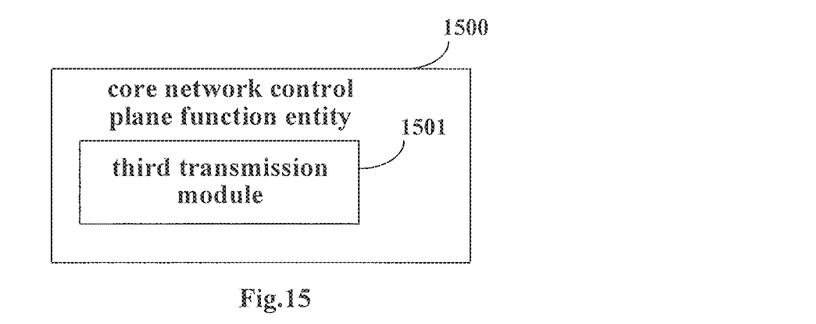
FIG. 15 is a schematic view showing a core network control plane function entity according to some embodiments of the present disclosure.

The present disclosure further provides in some embodiments a core network control plane function entity 1500 which, as shown in FIG. 15, includes a third transmission module 1501 configured to transmit a handover request message to a target base station. The handover request message may include a QoS flow-based QoS parameter and/or a RB-based QoS parameter. The QoS flow-based QoS parameter or the RB-based QoS parameter may be adopted by the target base station to perform admission control.

In a possible embodiment of the present disclosure, the core network control plane function entity may further include: a third reception module configured to receive a handover request acknowledge message from the target base station, the handover request configuration message including information of a QoS flow or a RB admitted successfully or unsuccessfully by the target base station; and a fourth transmission module configured to transmit a handover command to a source base station.

According to the embodiments of the present disclosure, the source base station (i.e., the source NG-NB) may transmit a handover preparation request message to the core network control plane function entity (e.g., the 5G CN-C), and the handover preparation message may carry the mapping relationship from the QoS flows to the RBs generated by the source station and the RB-based QoS parameter. The mapping relationship and the RB-based QoS parameter are transparent to a core network, so they may be passed through the core network control plane function entity to the target base station (i.e., the target NG-NB). Then, the core network control plane function entity may transmit the handover request message to the target base station, and the handover request message may carry the QoS flow-based QoS parameter and the information passed through the core network control plane function entity to the target base station from the source base station. The target base station may perform the admission control in accordance with the QoS flow-based QoS parameter or the RB-based QoS parameter, transmit back a handover request acknowledge request carrying information of the QoS flow admitted successfully and unsuccessfully to the core network control plane function entity, and transmit the handover request acknowledge request carrying information of the RB admitted unsuccessfully to the target NG-NB (the information of the RB admitted unsuccessfully is transparent to the core network). The target base station may converge the QoS flows which have the same QoS requirement, and generate a convergence mapping relationship from the QoS flows to the RBs and a corresponding RB configuration parameter. When a mapping relationship from the QoS flows to the RBs is carried in the source base station, the target base station may generate its own convergence mapping relationship from the QoS flows to the RBs and the corresponding configuration parameter with reference to the mapping relationship from the QoS flows to the RBs. The core network control plane function entity may transmit the handover command carrying the information of the QoS flow admitted unsuccessfully by the target side to the source base station.

Figure 16:
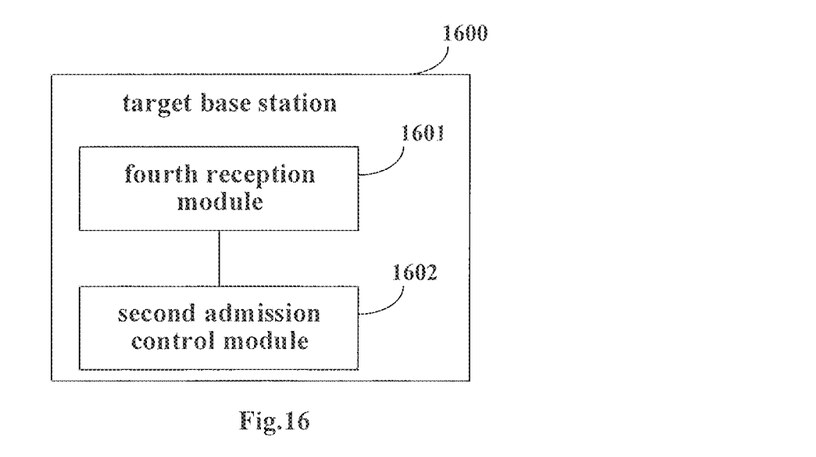
FIG. 16 is another schematic view showing the target base station according to some embodiments of the present disclosure.

The present disclosure further provides in some embodiments a target base station 1600 which, as shown in FIG. 16, includes: a fourth reception module 1601 configured to receive a handover request message from a core network control plane function entity, the handover request message including a QoS flow-based QoS parameter and/or a RB-based QoS parameter; and a second admission control module 1602 configured to perform admission control in accordance with the QoS flow-based QoS parameter or the RB-based QoS parameter.

In a possible embodiment of the present disclosure, the target base station may further include a third generation module configured to generate a convergence mapping relationship from QoS flows to RBs of the target base station and a corresponding RB configuration parameter in accordance with the QoS flow-based QoS parameter.

In a possible embodiment of the present disclosure, the handover request message may further include a mapping relationship from QoS flows to RBs generated by a source base station. The target base station may further include a fourth generation module configured to generate the convergence mapping relationship from the QoS flows to the RBs of the target base station and the corresponding RB configuration parameter in accordance with the mapping relationship from the QoS flows to the RBs generated by the source base station.

In a possible embodiment of the present disclosure, the target base station may further include a fifth transmission module configured to transmit a handover confirmation message to the core network control plane function entity, and the handover request acknowledge message includes information of the RB or QoS flow admitted successfully or unsuccessfully by the target base station.

In a possible embodiment of the present disclosure, the target base station may further include: a sixth transmission module configured to transmit a transmission path switch message carrying the information of the QoS flow having been admitted to a core network control plane function entity; and a fifth reception module configured to receive a transmission path switch confirmation message from the core network control plane function entity.

According to the embodiments of the present disclosure, the source base station (i.e., the source NG-NB) may transmit a handover preparation request message to the core network control plane function entity (e.g., the 5G CN-C), and the handover preparation message may carry the mapping relationship from the QoS flows to the RBs generated by the source station and the RB-based QoS parameter. The mapping relationship and the RB-based QoS parameter are transparent to a core network, so they may be passed through the core network control plane function entity to the target base station (i.e., the target NG-NB). Then, the core network control plane function entity may transmit the handover request message to the target base station, and the handover request message may carry the QoS flow-based QoS parameter and the information passed through the core network control plane function entity to the target base station from the source base station. The target base station may perform the admission control in accordance with the QoS flow-based QoS parameter or the RB-based QoS parameter, transmit back a handover request acknowledge request message carrying information of the QoS flow admitted successfully and unsuccessfully to the core network control plane function entity, and transmit the handover request acknowledge request carrying information of the RB admitted unsuccessfully to the target NG-NB (the information of the RB admitted unsuccessfully is transparent to the core network). The target base station may converge the QoS flows which have the same QoS requirement, and generate a convergence mapping relationship from the QoS flows to the RBs and a corresponding RB configuration parameter. When a mapping relationship from the QoS flows to the RBs is carried in the source base station, the target base station may generate its own convergence mapping relationship from the QoS flows to the RBs and the corresponding configuration parameter with reference to the mapping relationship from the QoS flows to the RBs. The core network control plane function entity may transmit the handover command carrying the information of the QoS flow admitted unsuccessfully by the target side to the source base station.

It should be further appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in one or more embodiments in any appropriate manner.

It should be further appreciated that, serial numbers of the steps shall not be used to define the order of the steps, and instead, the order of the steps shall be determined in accordance with their functions and internal logics.

In addition, the terms "system" and "network" may be replaced with each other. The expression "and/or" is merely used to describe the relationship between objects, and it includes three relationships. For example, "A and/or B" may represent that, there is only A, there are both A and B, and there is only B. Further, the symbol "/" usually refers to "or".

It should be further appreciated that, the expression "B corresponding to A" means that B is associated with A and may be determined in accordance with A. However, when B is determined in accordance with A, it means that B may be determined in accordance with A and/or any other information.

It should be further appreciated that, the device and method may be implemented in any other ways. For example, the embodiments for the devices are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These combined units may be implemented in the form of hardware, or a functional unit including hardware plus software.

The combined units implemented in a form of the software functional units may be stored in a computer-readable medium. These software functional units may be stored in a storage medium and include multiple instructions so as to enable a computer device (a personal computer, a server or network device) to execute parts of the steps of the transmission and reception methods according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for processing a Quality of Service (QoS) parameter in a handover scenario, comprising:
   transmitting, by a source base station, a handover request message to a target base station,
   wherein the handover request message comprises a QoS flow-based QoS parameter and a Radio Bearer (RB)-based QoS parameter, or the handover request message comprises the QoS flow-based QoS parameter;
   the QoS flow-based QoS parameter or the RB-based QoS parameter is configured to be adopted by the target base station to perform admission control; and
   the handover request message further comprises: a mapping relationship from QoS flows to RBs generated by the source base station,
   the method further comprises: generating, by the target base station in accordance with the mapping relationship from the QoS flows to the RBs generated by the source base station, a convergence mapping relationship from QoS flows of the target base station to RBs, and a corresponding RB configuration parameter.

2. The method according to claim 1, further comprising:
receiving, by the source base station, a handover response message transmitted from the target base station,
wherein the handover response message comprises information of a RB or information of a QoS flow admitted successfully or unsuccessfully by the target base station.

3. A source base station for implementing the method according to claim 1, comprising a processor, a memory and a transceiver, wherein
the processor is configured to read a program stored in the memory to:
transmit through the transceiver a handover request message to a target base station,
wherein the handover request message comprises a QoS flow-based QoS parameter and/or a RB-based QoS parameter, and the QoS flow-based QoS parameter or the RB-based QoS parameter is configured to be adopted by the target base station to perform admission control,
the transceiver is configured to receive and transmit data, and
the memory is configured to store therein data for an operation of the processor.

4. The source base station according to claim 3, wherein
the handover request message further comprises: a mapping relationship from QoS flows to RBs generated by the source base station.

5. The source base station according to claim 3, wherein
the processor is further configured to read a program stored in the memory to:
receive through the transceiver a handover response message transmitted from the target base station,
wherein the handover response message comprises information of a RB or information of a QoS flow admitted successfully or unsuccessfully by the target base station.

6. A method for processing a QoS parameter in a handover scenario, comprising:
receiving, by a target base station, a handover request message transmitted from a source base station, the handover request message comprising a QoS flow-based QoS parameter and a RB-based QoS parameter, or the handover request message comprising the QoS flow-based QoS parameter; and
performing, by the target base station, admission control in accordance with the QoS flow-based QoS parameter or the RB-based QoS parameter,
the handover request message further comprises: a mapping relationship from QoS flows to RBs generated by the source base station; and
the method further comprises: generating, by the target base station in accordance with the mapping relationship from the QoS flows to the RBs generated by the source base station, a convergence mapping relationship from QoS flows of the target base station to RBs, and a corresponding RB configuration parameter.

7. The method according to claim 6, further comprising:
generating, by the target base station in accordance with the QoS flow-based QoS parameter, a convergence mapping relationship from QoS flows of the target base station to RBs, and a corresponding RB configuration parameter.

8. The method according to claim 6, further comprising:
transmitting, by the target base station, a handover request response message to the source base station, wherein the handover request response message comprises information of a RB or information of a QoS flow admitted successfully or unsuccessfully by the target base station.

9. The method according to claim 6, further comprising:
transmitting, by the target base station, a transmission path switch message to a core network control plane function entity, wherein the transmission path switch message carries information of the QoS flow having been admitted; and
receiving, by the target base station, a transmission path switch confirmation message transmitted from the core network control plane function entity.

10. A target base station for implementing the method according to claim 6, comprising a processor, a memory and a transceiver, wherein
the processor is configured to read a program stored in the memory to:
receive through the transceiver a handover request message transmitted from a source base station, the handover request message comprising a QoS flow-based QoS parameter and/or a RB-based QoS parameter; and
perform admission control in accordance with the QoS flow-based QoS parameter or the RB-based QoS parameter,
the transceiver is configured to receive and transmit data, and
the memory is configured to store therein data for an operation of the processor.

11. The target base station according to claim 10, wherein
the processor is further configured to read a program stored in the memory to:
generate, in accordance with the QoS flow-based QoS parameter, a convergence mapping relationship from QoS flows of the target base station to RBs, and a corresponding RB configuration parameter.

12. The target base station according to claim 10, wherein
the handover request message further comprises: a mapping relationship from QoS flows to RBs generated by the source base station; and
wherein the processor is further configured to read a program stored in the memory to: generate, in accordance with the mapping relationship from the QoS flows to the RBs generated by the source base station, a convergence mapping relationship from QoS flows of the target base station to RBs, and a corresponding RB configuration parameter.

13. The target base station according to claim 10, wherein
the processor is further configured to read a program stored in the memory to:
transmit through the transceiver a handover request response message to the source base station,
wherein the handover request response message comprises information of a RB or information of a QoS flow admitted successfully or unsuccessfully by the target base station.

14. The target base station according to claim 10, wherein
the processor is further configured to read a program stored in the memory to:
transmit through the transceiver a transmission path switch message to a core network control plane function entity, wherein the transmission path switch message carries information of the QoS flow having been admitted; and
receive through the transceiver a transmission path switch confirmation message transmitted from the core network control plane function entity.

15. A method for processing a QoS parameter in a handover scenario, comprising:
- transmitting, by a core network control plane function entity, a handover request message to a target base station,
- wherein the handover request message comprises a QoS flow-based QoS parameter and/or a RB-based QoS parameter, and the QoS flow-based QoS parameter or the RB-based QoS parameter is configured to be adopted by the target base station to perform admission control,
- the method further comprises:
- receiving, by the core network control plane function entity, a handover request acknowledge message transmitted from the target base station, the handover request acknowledge message comprising information of a RB or information of a QoS flow admitted successfully or unsuccessfully by the target base station; and
- transmitting, by the core network control plane function entity, a handover command to a source base station.

16. A core network control plane function entity for implementing the method according to claim 15, comprising a processor, a memory and a transceiver, wherein
- the processor is configured to read a program stored in the memory to:
  - transmit through the transceiver a handover request message to a target base station,
    - wherein the handover request message comprises a QoS flow-based QoS parameter and/or a RB-based QoS parameter, and the QoS flow-based QoS parameter or the RB-based QoS parameter is configured to be adopted by the target base station to perform admission control,
- the transceiver is configured to receive and transmit data, and
- the memory is configured to store therein data for an operation of the processor.

17. The core network control plane function entity according to claim 16, wherein the processor is further configured to read a program stored in the memory to:
- receive through the transceiver a handover request acknowledge message transmitted from the target base station, the handover request acknowledge message comprising information of a RB or information of a QoS flow admitted successfully or unsuccessfully by the target base station; and
- transmit through the transceiver a handover command to a source base station.

* * * * *